United States Patent
Karunakaran et al.

(10) Patent No.: US 10,320,801 B2
(45) Date of Patent: *Jun. 11, 2019

(54) IDENTITY PROXY TO PROVIDE ACCESS CONTROL AND SINGLE SIGN ON

(71) Applicant: MOBILE IRON, INC., Mountain View, CA (US)

(72) Inventors: Kumara Das Karunakaran, Milpitas, CA (US); Vijay Pawar, Palo Alto, CA (US); Jian Liu, Fremont, CA (US)

(73) Assignee: MOBILE IRON, INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/141,716

(22) Filed: Sep. 25, 2018

(65) Prior Publication Data

US 2019/0028480 A1 Jan. 24, 2019

Related U.S. Application Data

(63) Continuation of application No. 15/962,291, filed on Apr. 25, 2018, now Pat. No. 10,116,663, which is a (Continued)

(51) Int. Cl.
*G06F 17/30* (2006.01)
*H04L 29/06* (2006.01)
(Continued)

(52) U.S. Cl.
CPC ............ *H04L 63/102* (2013.01); *G06F 21/33* (2013.01); *H04L 63/0815* (2013.01);
(Continued)

(58) Field of Classification Search
CPC ..... H04L 9/3213; H04L 63/102; G06F 21/31; G06F 21/50; G06F 11/3051
(Continued)

(56) References Cited

U.S. PATENT DOCUMENTS 7,359,920 B1 4/2008 Rybicki
8,776,209 B1 7/2014 Kumar
(Continued)

OTHER PUBLICATIONS

Uymatiao et al, Time-based OTP Authentication via Secure Tunnel (TOAST): A Mobile TOTP Scheme Using TLS Seed Exchange and Encrypted Offline Keystore, 2014, IEEE, pp. 225-229.*
(Continued)

*Primary Examiner* — Luu T Pham
*Assistant Examiner* — Jenise E Jackson
(74) *Attorney, Agent, or Firm* — Van Pelt, Yi & James LLP

(57) ABSTRACT

Techniques to provide secure access to a cloud-based service are disclosed. In various embodiments, a request is received from a client app on a device to connect to a security proxy associated with the cloud-based service. A secure tunnel connection between the device and a node with which the security proxy is associated is used to establish the requested connection to the security proxy. Information associated with the secure tunnel is used to determine that the requesting client app is authorized to access the cloud-based service from the device and to obtain from an identity provider associated with the cloud-based service a security token to be used by the client app to authenticate to the cloud-based service.

19 Claims, 13 Drawing Sheets

Related U.S. Application Data continuation of application No. 15/006,906, filed on Jan. 26, 2016, now Pat. No. 10,003,600.

(60) Provisional application No. 62/107,927, filed on Jan. 26, 2015.

(51) Int. Cl.
*H04W 12/06* (2009.01)
*G06F 21/33* (2013.01)

(52) U.S. Cl.
CPC .......... *H04L 63/0884* (2013.01); *H04L 63/10* (2013.01); *H04W 12/06* (2013.01); *H04L 63/0272* (2013.01); *H04L 63/0281* (2013.01); *H04L 63/0823* (2013.01)

(58) Field of Classification Search
USPC .......................................................... 726/4
See application file for complete search history.

(56) References Cited

U.S. PATENT DOCUMENTS

| | | | |
|---|---|---|---|
| 9,137,131 B1* | 9/2015 | Sarukkai | H04L 43/0876 |
| 9,436,820 B1* | 9/2016 | Gleichauf | G06F 21/50 |
| 10,079,834 B2 | 9/2018 | Karunakaran | |
| 2005/0262357 A1 | 11/2005 | Araujo | |
| 2006/0264202 A1 | 11/2006 | Hagmeier | |
| 2007/0234408 A1 | 10/2007 | Burch | |
| 2008/0039085 A1 | 2/2008 | Phan-Anh | |
| 2008/0060055 A1 | 3/2008 | Lau | |
| 2008/0083025 A1 | 4/2008 | Meijer | |
| 2008/0222714 A1 | 9/2008 | Wahl | |
| 2009/0222902 A1 | 9/2009 | Bender | |
| 2009/0249439 A1 | 10/2009 | Olden | |
| 2010/0211780 A1 | 8/2010 | Mukkara | |
| 2011/0030043 A1 | 2/2011 | Jones | |
| 2011/0265155 A1 | 10/2011 | Liu | |
| 2012/0005745 A1 | 1/2012 | Wei | |
| 2012/0179909 A1 | 7/2012 | Sagi | |
| 2012/0204025 A1 | 8/2012 | Lau | |
| 2012/0272058 A1 | 10/2012 | Wang | |
| 2012/0278872 A1* | 11/2012 | Woelfel | H04L 61/2596 726/7 |
| 2013/0007845 A1 | 1/2013 | Chang | |
| 2013/0031356 A1 | 1/2013 | Prince | |
| 2013/0305333 A1 | 11/2013 | Katzer | |
| 2014/0020072 A1* | 1/2014 | Thomas | H04L 63/0815 726/7 |
| 2014/0067990 A1 | 3/2014 | Abdelhameed | |
| 2014/0122866 A1 | 5/2014 | Haeger | |
| 2014/0282817 A1 | 9/2014 | Singer | |
| 2014/0331060 A1 | 11/2014 | Hayton | |
| 2014/0331297 A1 | 11/2014 | Innes | |
| 2014/0344340 A1 | 11/2014 | Tang | |
| 2014/0373130 A1 | 12/2014 | De Oliveira | |
| 2015/0026757 A1 | 1/2015 | Reddy | |
| 2015/0143504 A1* | 5/2015 | Desai | H04L 45/14 726/13 |
| 2015/0341445 A1* | 11/2015 | Nikolov | H04L 67/16 709/203 |
| 2016/0105456 A1* | 4/2016 | Thakkar | H04L 63/1408 709/224 |
| 2016/0173490 A1* | 6/2016 | Phegade | G06F 21/42 726/7 |
| 2016/0344736 A1* | 11/2016 | Khait | H04L 63/0807 |

OTHER PUBLICATIONS

Markovic, Data Protection Techniquest Cryptographic Protocols and PKI Systems in Modern Computer Networks, Jun. 30, 2007, pp. 13-24.*
Ahmad et al., A Multi-Token Authorization Strategy for Secure Mobile Cloud Computing, IEEE, 2014, pp. 136-141.
Balamurugan B et al., Enhanced Framework for Verifying User Authorization and Data Correctness using Token Management System in the Cloud, IEEE, 2014, pp. 1443-1447.
Lakshman et al., Enhancing Enterprise Field Productivity via Cross Platform Mobile Cloud Apps, ACM, Jun. 28, 2011, pp. 27-32.
Mkpong-Ruffin et al., Quantitative Software Security Risk Assessment Model, ACM, Oct. 29, 2007, pp. 31-33.
Nath et al., Reconciliation Engine and Metric for Network Vulnerability Assessment, ACM, Aug. 19, 2012, pp. 9-21.

* cited by examiner

US 10,320,801 B2

IDENTITY PROXY TO PROVIDE ACCESS CONTROL AND SINGLE SIGN ON

CROSS REFERENCE TO OTHER APPLICATIONS

This application is a continuation of U.S. patent application Ser. No. 15/962,291, entitled IDENTITY PROXY TO PROVIDE ACCESS CONTROL AND SINGLE SIGN ON, filed Apr. 25, 2018, which is a continuation of U.S. patent application Ser. No. 15/006,906, now U.S. Pat. No. 10,003,600, entitled IDENTITY PROXY TO PROVIDE ACCESS CONTROL AND SINGLE SIGN ON, filed Jan. 26, 2016, which claims priority to U.S. Provisional Patent Application No. 62/107,927, entitled IDENTITY PROXY TO PROVIDE MOBILE APP ACCESS CONTROL AND SINGLE SIGN ON, filed Jan. 26, 2015, all of which are incorporated herein by reference for all purposes.

BACKGROUND OF THE INVENTION

Increasingly, mobile devices are incorporating security protections and techniques into the operating system. In many types of device, applications are "sandboxed" and cannot be attacked by other apps on the device. This also means that each application in its own sandbox typically performs the authentication and authorization process. Applications typically cannot share sessions or tokens which can allow one application to authenticate and other applications to leverage the same session/token to get single sign-on, for example.

Security Assertion Markup Language (SAML) is an XML standard that allows user authentication and authorization data to be exchanged. Using SAML, an online service provider (SP) can contact a separate online identity provider (IDP) to authenticate users who are trying to access a secure resource. In mobile devices, for example, SAML or other standards and/or protocols may be used to authenticate mobile app users to associated online services. However, some apps may not support certain protocols/standards and/or may not support certain techniques, such as redirection to a separate IDP.

Using Basic authentication may not be desired, for example in order to prevent a user's Enterprise credentials (such as Enterprise username and password) from being exposed on the mobile device and/or to a cloud-based service provider (SP).

BRIEF DESCRIPTION OF THE DRAWINGS

Various embodiments of the invention are disclosed in the following detailed description and the accompanying drawings.

DETAILED DESCRIPTION

Figure 1A:
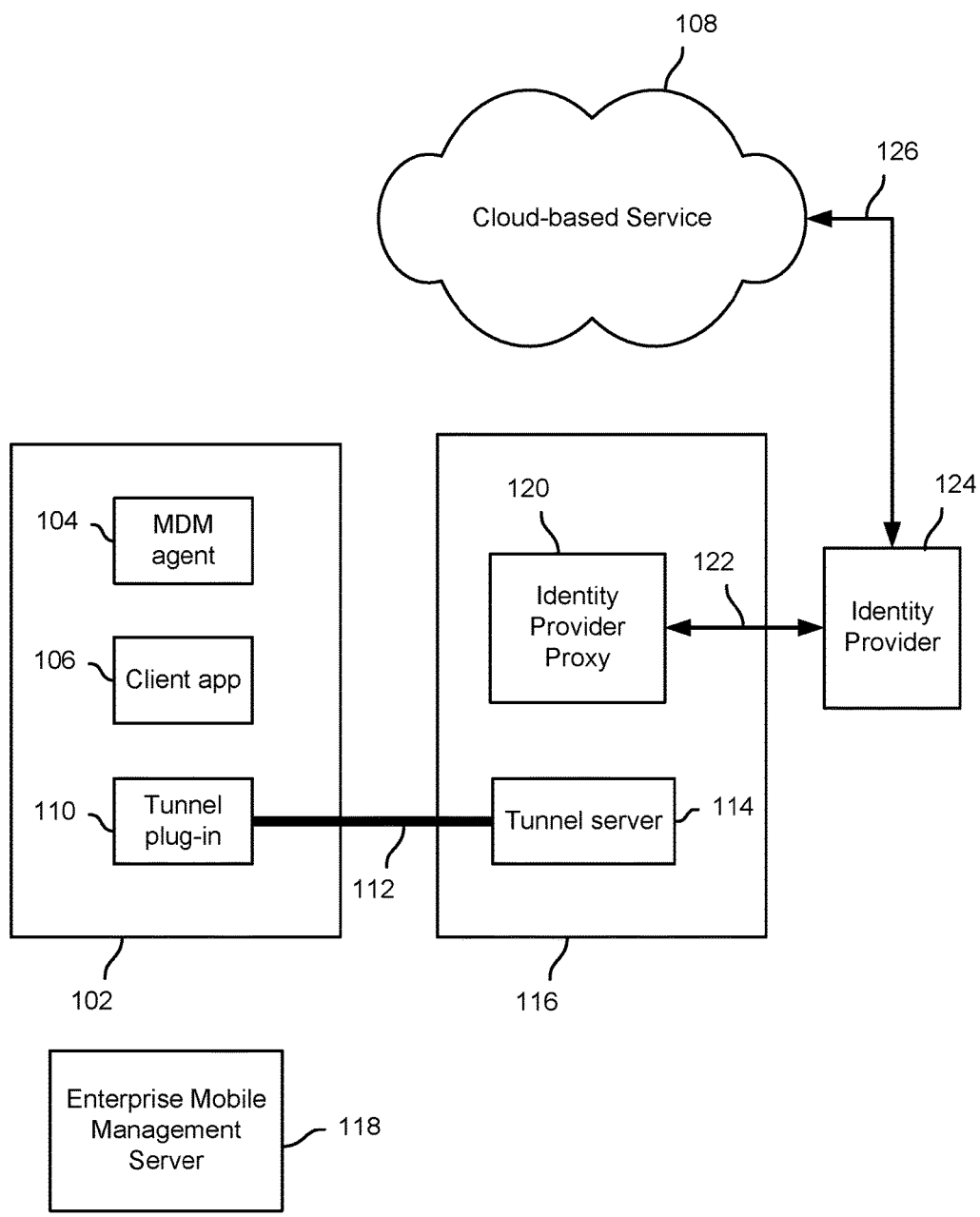
FIG. 1A is a block diagram illustrating an embodiment of a system to provide secure mobile access to a cloud-based service.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A secure identity proxy to access a secure resource for use with modern operating systems, including without limitation mobile apps running on mobile operating systems, is disclosed. In various embodiments, the identity proxy may be used to access a secure resource from a mobile device, such as a mobile app (e.g., an app running on an iOS® or Android® operating system and/or device), or in other contexts in which applications may be sandboxed or otherwise isolated from each other by the operating system (e.g., Microsoft Windows® 10). In various embodiments, the identity proxy may be configured and/or used to perform one or more of the following:

Secure access control with respect to mobile app users, incorporating dynamic information such as mobile device security posture, whether the app is under management, etc., without exposing credentials to the service provider Single sign on for multiple mobile device apps, e.g., a set of managed apps associated with an enterprise or other entity.

In various embodiments, a secure proxy may be provided. The secure proxy may include a tunnel server to which managed mobile devices may be configured, e.g., by a tunnel plug-in or other tunnel client, to connect via a secure tunnel. Establishment of the tunnel may be based at least in part on a security certificate received from the tunnel client or another trusted client on the mobile device. Device identity may be determined based on the certificate, and device security posture information (e.g., under management, compromised, lost/stolen, etc.) may be used to determine whether a secure tunnel will be established. Once trust has been established, a TCP or other connection from the mobile client app being used to access a cloud-based service to an Identity Provider (IdP) Proxy may be established and used to obtain for the client app a SAML assertion (or other security token or information) to be used by the client app to access the cloud-based service. In some embodiments, if the security posture or other information of the app, device, user, etc. changes, the previously-established access to the cloud-based service may be cut off. In some embodiments, single sign on is provided by enabling a secure tunnel and the associated trust of the mobile device, once established, to be used by other client apps on the mobile device to obtain via the IdP Proxy SAML assertions or other tokens to access respective cloud-based services associated with such other client apps.

In some embodiments, the secure proxy may comprise a delegated identity provider (delegated IdP). Trust may be established between a service provider and an identity provider proxy (IdP Proxy) comprising the secure proxy. A service provider proxy may be included and used in various embodiments to provide secure access when access is requested directly from an identity provider (IdP), e.g., via IdP initiated authentication.

FIG. 1A is a block diagram illustrating an embodiment of a system to provide secure mobile access to a cloud-based service. In the example shown, a mobile device 102 includes a mobile device management agent 104. The mobile device management (MDM) agent 104 may include one or both of a native MDM client and/or functionality of a mobile operating system (e.g., iOS, Android) of mobile device 102 and a third party MDM client, agent, and/or app, e.g., one provided by a third party mobility management provider, such as Mobile Iron, Inc. Mobile device 102 has installed thereon a mobile app 106 configured to be used to access a cloud-based service 108. Examples of cloud-based service 108 include, without limitation, cloud-based productivity suites, such as Microsoft® Office 365, and customer relationship management (CRM) and other business applications, such as SAP® and Salesforce.Com®. In various embodiments, cloud-based services may be accessed by one or more of a native client application (e.g., a mail application); a third party client app associated with the cloud-based service, e.g., one provided by the service; and a third party client app that is not provide by the service but which can be used and/or configured to access the service.

In the example shown in FIG. 1A, a tunnel plug-in 110 has been installed on mobile device 102. In various embodiments, tunnel plug-in 110 may be configured to establish a secure tunnel 112 to a tunnel server 114 running on a security proxy server or other server system 116. In some embodiments, a user of mobile device 102 may register the device, e.g. via an enterprise mobile management (EMM) server 118. EMM server 118 may be configured to configure the mobile device 102 to be managed by an EMM server 118 and associated elements, such as security proxy 116. EMM server 118 may be configured to establish MDM control over mobile device 118 via MDM agent 104, such as by causing an associated MDM agent 104 to be installed on the device and/or by configuring a native MDM functionality of mobile device 102. In various embodiments, client app 106 may be brought under management by EMM server 118 and/or MDM agent 104. For example, a configuration profile or other configuration data may be provided to ensure that connection requests and/or other traffic associated with client app 106 is sent via and/or under supervision of tunnel plug-in 110.

In various embodiments, tunnel plug-in 110 may be configured to selectively direct traffic associated with client app 106. For example, tunnel plug-in 110 may be configured to forward traffic addressed by client app 106 to cloud-based service 108 directly to cloud-based service 108, but to send via tunnel 112 traffic addressed to nodes associated with security proxy server 116. In some embodiments, the client app 106 may address all traffic to the service 108, and the mobile or other operating system (e.g., Android®, Microsoft Windows® 10) may be configured (e.g., by the mobile device management server or other MDM authority) to send selected app traffic directly to service 108 and other traffic from the same app only via a tunnel, such as tunnel 112.

In various embodiments, secure tunnel 112 may be established based at least in part on a certificate provisioned to tunnel plug-in 110, e.g., a certificate provide to tunnel plug-in 110 by EMM server 118.

In the example shown in FIG. 1A, security proxy 116 includes an Identity Provider (IdP) proxy 120 that is configured to have a "chained IdP" or other trust relationship 122 with a "real" Identity Provider (IdP) 124 associated with cloud-based service 108 via a trust relationship 126. In some embodiments, cloud-based service 108 may be configured to trust (e.g., based on a previously-exchanged certificate, etc.) real IdP 124 but to redirect connection requests received at cloud-based service 108 to IdP Proxy 120 to perform authentication, as described more fully below in connection with FIG. 1B.

Figure 1B:
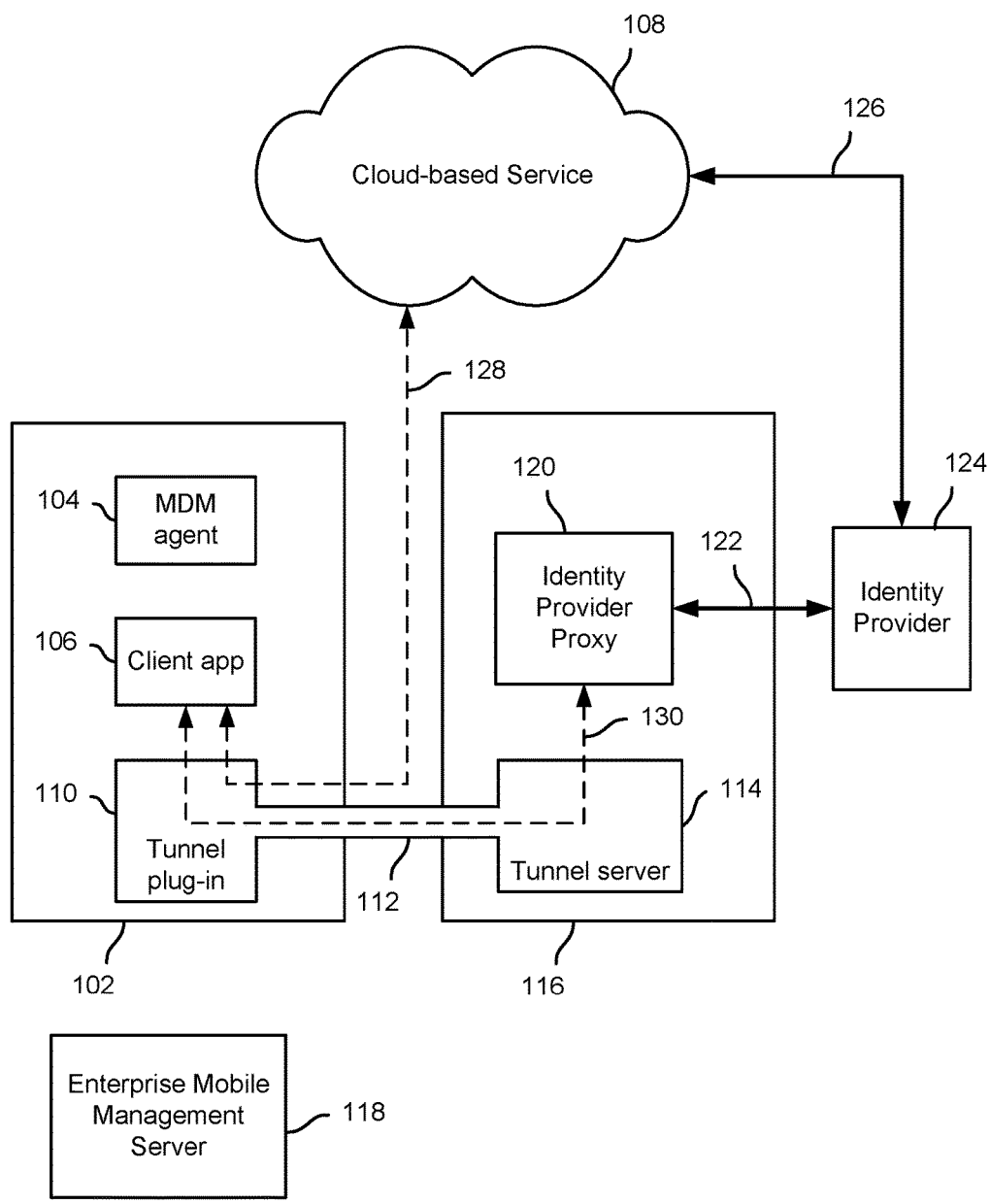
FIG. 1B is a block diagram illustrating an embodiment of a system to provide secure mobile access to a cloud-based service.

FIG. 1B is a block diagram illustrating an embodiment of a system to provide secure mobile access to a cloud-based service. In the example shown, client app 106 sends via tunnel plug-in 110 to cloud-based service 108 a request to establish a connection 128 to cloud-based service 108. In various embodiments, mobile device 102 may be configured, e.g., by MDM agent 104 and/or native MDM functionality of mobile device 102, to send via tunnel plug-in 110 connection requests and/or other communications associated with client app 106. In various embodiments, cloud-based service 108 may be configured to redirect to an authentication node connection requests from clients, such as client app 106, that have not yet been authenticated. In some embodiments, the Security Access Markup Language (SAML) standard may be used.

In the example shown, cloud-based service 108 may be configured to redirect connection requests to a URL associated with IdP Proxy 120. Upon being redirected, client app 106 may send a request to establish a connection 130 to IdP Proxy 120, to perform authentication required to gain access to cloud-based service 108. In various embodiments, tunnel plug-in 110 may be configured to recognize the connection request as being associated with IdP Proxy 120, e.g., based on the URL, and may be configured to send connection requests and/or other traffic directed to IdP Proxy 120 only via a secure tunnel, such as tunnel 112. In some embodiments, if the tunnel 112 has not already been established, tunnel plug-in 110 may be configured to establish the secure tunnel in response to the connection request, and to send the connection request via the tunnel once the tunnel has been established.

In various embodiments, a certificate or other security credential and/or information provisioned to tunnel plug-in 110 may be used by tunnel plug-in 110 to establish secure tunnel 112. The certificate or other information may be used by the tunnel server 114, the IdP Proxy 120, and/or other components to authenticate the user and/or mobile device 102. In some embodiments, certificate-based authentication enables authentication to be performed without requiring that the user's enterprise credentials, e.g., username and password, to be entered at or otherwise store on the mobile device 102 and/or disclosed to the cloud-based service 108. In some embodiments, the certificate presented by tunnel plug-in 110 to establish secure tunnel 112 may be used at security proxy server 116 to authenticate the user and mobile device 102. User and/or device information may be associated with the certificate at the security proxy server 116. Security proxy server 116 may have a trust relationship and a direct or indirect (e.g., via another server) connection to an enterprise directory, such as a Microsoft® Active Directory®, and may be configured to obtain user information (e.g., role, region, group or division, etc.) from the directory.

In the example shown in FIG. 1B, tunnel server 114 and/or IdP proxy 120 have allowed connection 130 to be established between client app 106 and IdP Proxy 120 via secure tunnel 112. In some embodiments, a device security posture and/or other posture information of mobile device 102 may be checked prior to allowing secure tunnel 112 and/or connection 130 to be established. For example, a compliance check may be performed by querying EMM server 118 to ensure mobile device 102 is and/or remains in compliance. EMM server 118 may be configured to receive information from mobile device 102, e.g., via MDM agent 104, and to make a security or other device compliance posture determination based thereon. For example, if mobile device 102 and/or one or more apps previously under management are no longer under management, or the mobile device 102 has been "jailbroken" or root access obtained or otherwise compromised, or if an unauthorized app has been installed, etc., EMM server 118 may determine the mobile device 102 is no longer in compliance. In various embodiments, one or more of the tunnel plug-in 110, tunnel server 114, IdP Proxy 120, and/or other components may be configured to perform a compliance check regarding mobile device 102.

In some embodiments, one or more of the tunnel server 114, IdP Proxy 120, and/or IdP 124 may be included in EMM server 118. In some embodiments, e.g., if the EMM server 118 is on premises and/or the IdP 124 is included in EMM server 118, the IdP Proxy 120 may be omitted. In some embodiments, at least a limited tunnel server 114 maybe included in EMM server 118. Tunnel clients, such as tunnel plug-in 110, may be configured to perform mobile device compliance check by communicating directly with EMM server 118.

In some embodiments, tunnel plug-in 110 may support and provide advanced split tunneling capabilities. For example, tunnel plug-in 110 may be configured in some embodiments to select, from among a plurality of tunnel servers, which tunnel server it needs to be used for various destinations, in addition to sending traffic directly to a service provider or other destination. For example, IdP Proxy traffic may be sent to the EMM server 118, in embodiments in which IdP Proxy 120 is included in EMM server 118, while traffic to a cloud-based service provider may be sent directly to the service.

In various embodiments, ongoing compliance monitoring is performed subsequent to establishing tunnel 112 and/or connection 130. If a previously-compliant mobile device 102 is determined to have fallen out of compliance, a responsive action may be taken, e.g., cutting off one or more of connection 130, tunnel 112, and communications directly to cloud-based service 108 from client app 106. In various embodiments, ongoing compliance may be monitored and/or access controls enforced by one or both of the tunnel server and the tunnel plugin. For example, the tunnel plugin may enforce local policies, such as "out of contact with EMM server for over a prescribed number of hours." In some embodiments, split tunneling may be used, and policies may be enforced on a per app and/or per tunnel basis.

In various embodiments, connection 130 may be used by client app 106 to obtain from IdP Proxy 120 a SAML assertion or other security token to be used by client app 106 to authenticate itself to cloud-based service 108. IdP Proxy 120 may be configured to obtain from IdP 124 on behalf of client app 106 a security token signed by IdP 124 and therefore trusted by cloud-based service 108. In some embodiments, once authenticated, service-related traffic between client app 106 and cloud-based service 108 may be sent via connection 128.

In various embodiments, single sign-on functionality may be provided. Tunnel plug-in 110 may be configured to use an existing secure tunnel, such as tunnel 112, that was established to enable a first client app, such as client app 106, to connect to IdP Proxy 120 to subsequently enable a second (or further) client app (not shown) to connect to IdP Proxy 120 via the same tunnel 112. Trust between mobile device 102 and security proxy server 116 would already have been established in connection with establishing tunnel 112, and in some embodiments user and/or device information obtained and cached in connection with authenticating and providing a security token to client app 106 may be used to obtain and provide to the second (or other subsequent) client app a security token to be used by the second (or other subsequent) app to authenticate itself and gain access to a cloud-based service with which the second (or other subsequent) app is associated.

Figure 2:
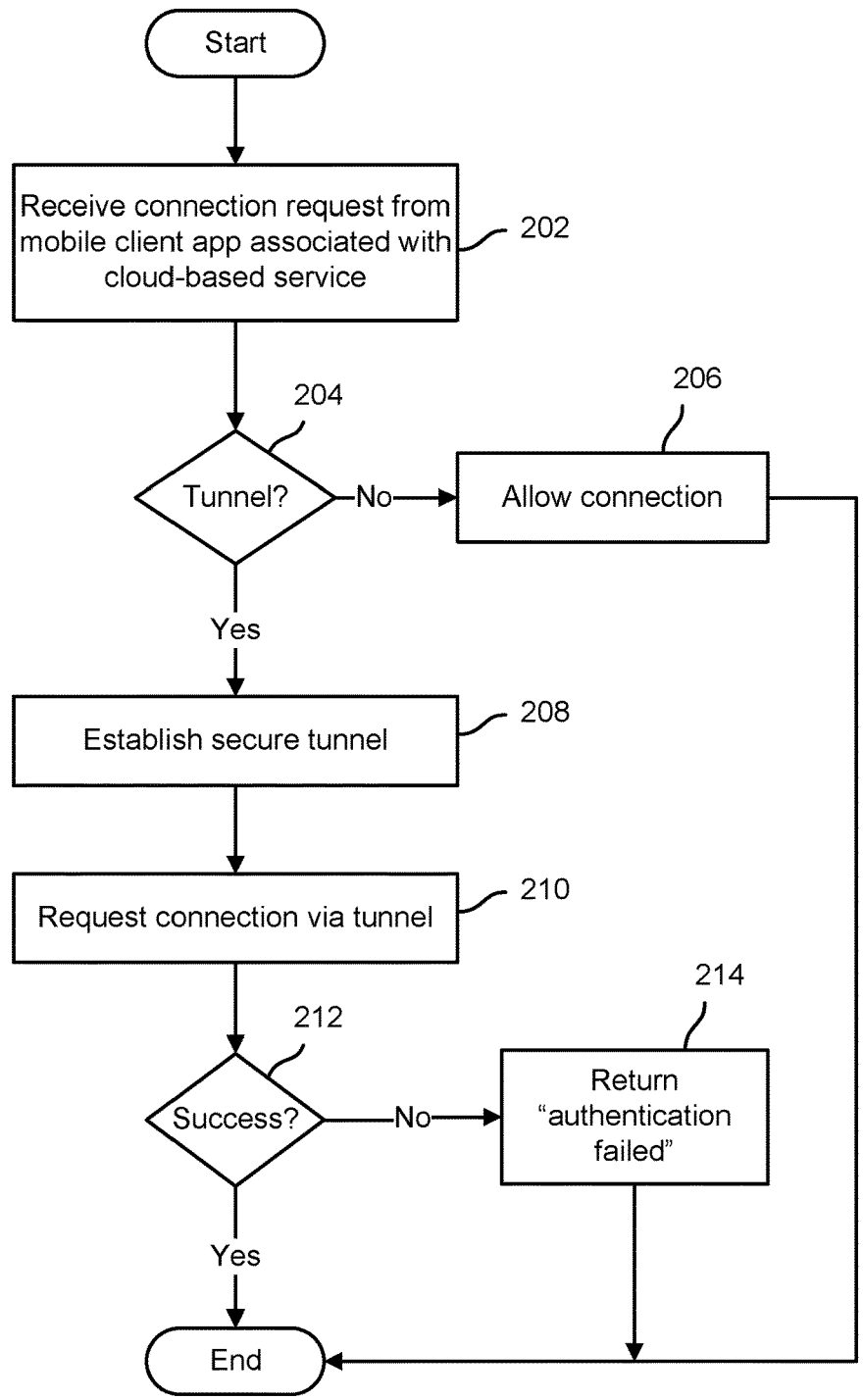
FIG. 2 is a flow chart illustrating an embodiment of a process to provide secure mobile access to a cloud-based service.

FIG. 2 is a flow chart illustrating an embodiment of a process to provide secure mobile access to a cloud-based service. In various embodiments, the process of FIG. 2 may be implemented by a tunnel plug-in or other tunnel client, such as tunnel plug-in 110 of FIGS. 1A and 1B. In the example shown, a connection request is received from a client app associated with a cloud-based service (202). If the connection request is not one to which the tunnel plug-in or other entity is configured to send only through a secure tunnel (204), such as tunnel 112 of FIGS. 1A and 1B, e.g., a connection request to the cloud-based service, then the connection is allowed (206) and the connection request is forwarded to the destination. If instead the connection request is determined to be associated with a destination to which connections are to be made only via a secure tunnel (204), such as a connection request to IdP Proxy 120 in the example shown in FIGS. 1A and 1B, a secure tunnel to the destination is established (208) (unless already present, in some embodiments), and the connection request is sent to the destination via the secure tunnel (210). If the connection is established successfully (212) the process ends. If not (212), a suitable error message is returned, such as "authentication failed" (214), after which the process ends.

Figure 3:
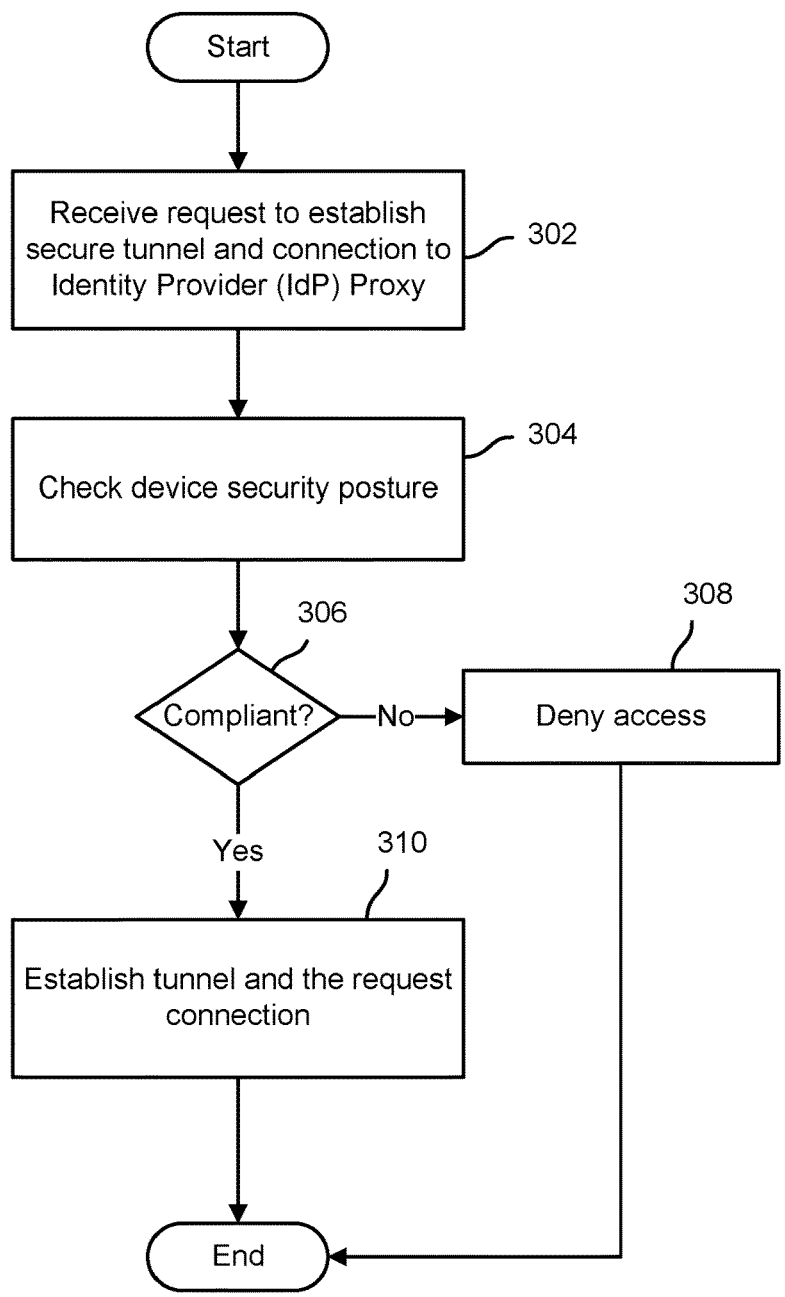
FIG. 3 is a flow chart illustrating an embodiment of a process to provide secure mobile access to a cloud-based service.

FIG. 3 is a flow chart illustrating an embodiment of a process to provide secure mobile access to a cloud-based service. In various embodiments, the process of FIG. 3 may be implemented by a tunnel server or other server-side component, such as tunnel server 114 of FIGS. 1A and 1B. In the example shown, a request to establish a secure tunnel and connect to an IdP Proxy is received from a mobile device (302). The security (or other compliance) posture of the mobile device is checked (304). For example, a compliance check may be performed at least in part based on information provided by an EMM server configured to manage the mobile device, such as EMM server 118 of FIGS. 1A and 1B. If the mobile device is determined to not be secure (or otherwise in compliance) (306), the request to establish the tunnel and/or to connect to the IdP Proxy is denied (308). If the mobile device is determined to be secure (or otherwise in compliance) (306), the tunnel and the requested connection to the IdP Proxy are established (310).

Figure 4:
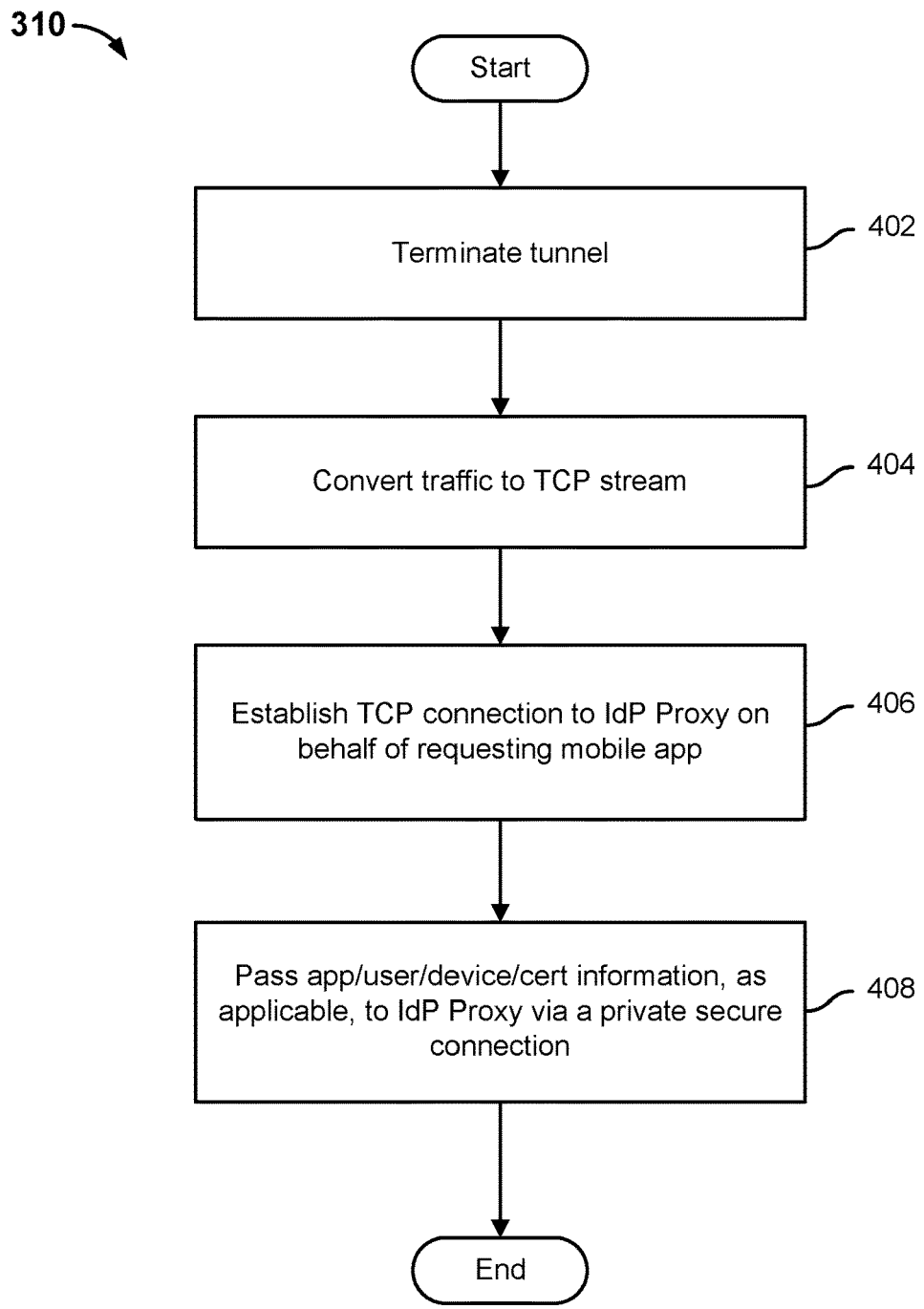
FIG. 4 is a flow chart illustrating an embodiment of a process to establish a secure tunnel and request a connection on behalf of a mobile client app.

FIG. 4 is a flow chart illustrating an embodiment of a process to establish a secure tunnel and request a connection on behalf of a mobile client app. In various embodiments, the process of FIG. 4 may be used to perform step 310 of the process of FIG. 3 and may be implemented by a tunnel server or other server-side component, such as tunnel server 114 of FIGS. 1A and 1B. In the example shown, a secure tunnel, such as tunnel 112 of FIGS. 1A and 1B is terminated (i.e., established) (402). Traffic to be sent to the IdP Proxy is converted to a TCP stream (e.g., by the tunnel server, such as tunnel server 114 of FIGS. 1A and 1B) (404). In some embodiments, a connection other than a TCP connection may be used, and step 404 is omitted. A TCP (or other) connection to the IdP Proxy is established on behalf of the mobile app and device that requested to connect to the IdP Proxy (406) and the TCP (or other) connection is used to send the TCP stream (or other app traffic). Mobile app, user, device, and/or certificate information is passed to the IdP Proxy via a secure private channel (408). In various embodiments, the information passed via the secure private channel to the IdP Proxy may be used by the IdP proxy to authenticate the user/device/app and/or to obtain from the "real" IdP associated with the cloud-based service a credential to be used by the requesting mobile client app to access the cloud-based service.

Figure 5:
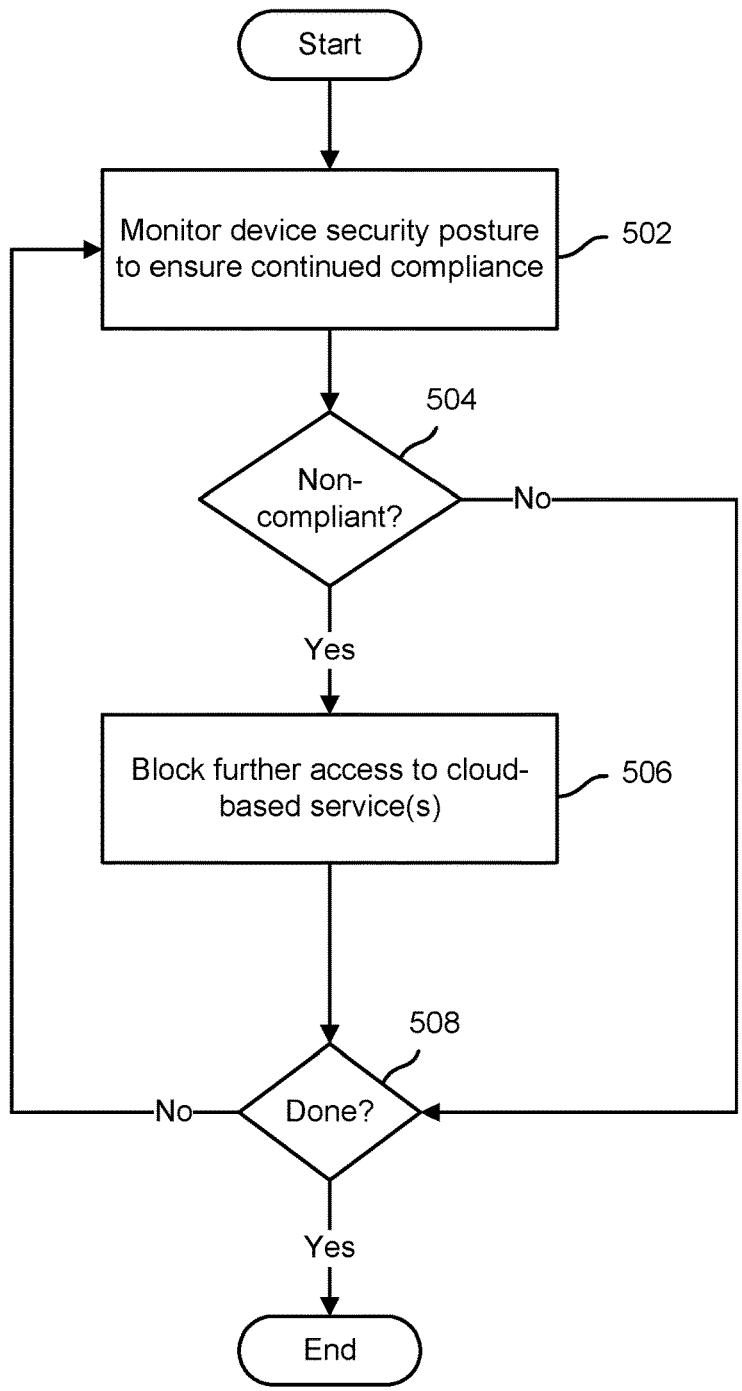
FIG. 5 is a flow chart illustrating an embodiment of a process to monitor and control access to a cloud-based service based on device security posture.

FIG. 5 is a flow chart illustrating an embodiment of a process to monitor and control access to a cloud-based service based on device security posture. In various embodiments, the process of FIG. 5 may be implemented by one or more of a mobile device management agent, a tunnel plug-in, a tunnel server, and an identity provider (IdP) proxy, such as MDM agent 104, tunnel plug-in 110, tunnel server 114, and/or IdP Proxy 120 of FIGS. 1A and 1B. In the example shown, mobile device security (or other compliance) posture information is monitored to ensure continued compliance (502). If the mobile device and/or mobile app are determined to have become non-compliant (504), further access to the cloud-based service is blocked (506). Otherwise, monitoring continues until done (508), e.g., the mobile device is no longer connected to any cloud-based service access to which is managed by the node implementing the process of FIG. 5.

Figure 6:
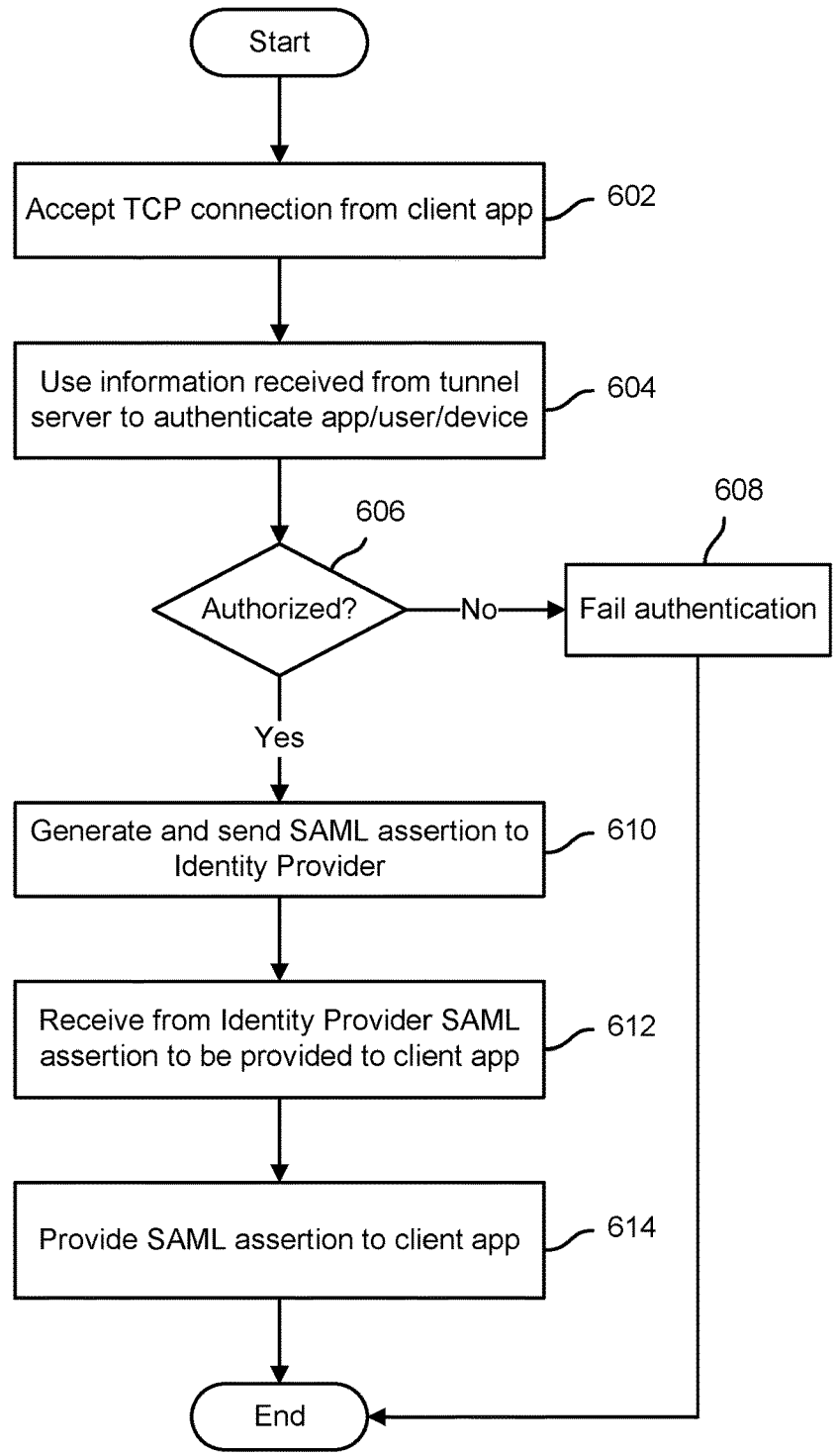
FIG. 6 is a flow chart illustrating an embodiment of a process to provide secure mobile access to a cloud-based service.

FIG. 6 is a flow chart illustrating an embodiment of a process to provide secure mobile access to a cloud-based service. In various embodiments, the process of FIG. 6 may be implemented by an identity provider (IdP) proxy, such as IdP Proxy 120 of FIGS. 1A and 1B. In the example shown, a TCP connection from a mobile client app is accepted (602). For example, in the example shown in FIG. 1B, IdP Proxy 120 may accept establishment of TCP connection 130. Mobile device, app, user and/or certificate information received via a secure private channel from a tunnel server (or other node) is used to authenticate one or more of the requesting app, mobile device, and/or user (604). If access to the cloud-based service to which access has been requested is determined not to be authorized (606), a response indicating that authentication has failed is returned (608). If access is determined to be authorized (606), a SAML assertion is generated and sent to an Identity Provider (IdP) associated with the cloud-based service (610), such as IdP 124 in the example shown in FIGS. 1A and 1B. A SAML assertion to be provided to the requesting client app to authenticate to the service is received from the IdP associated with the cloud-based service (612). The SAML assertion received from the IdP is provided to the client app that has requested access to the service (614), to be used by the client app to authenticate to the cloud-based service.

While the above example and other examples described herein mention the use of SAML assertions, in various embodiments other security tokens and/or credentials may be used and/or provided to enable a mobile client app to authenticate to a cloud-based service based at least in part on trust established between a mobile device and a management node, such as security proxy server system 116 of FIGS. 1A and 1B at least in part through establishment of a secure tunnel, such as tunnel 112 of FIGS. 1A and 1B.

Figure 7:
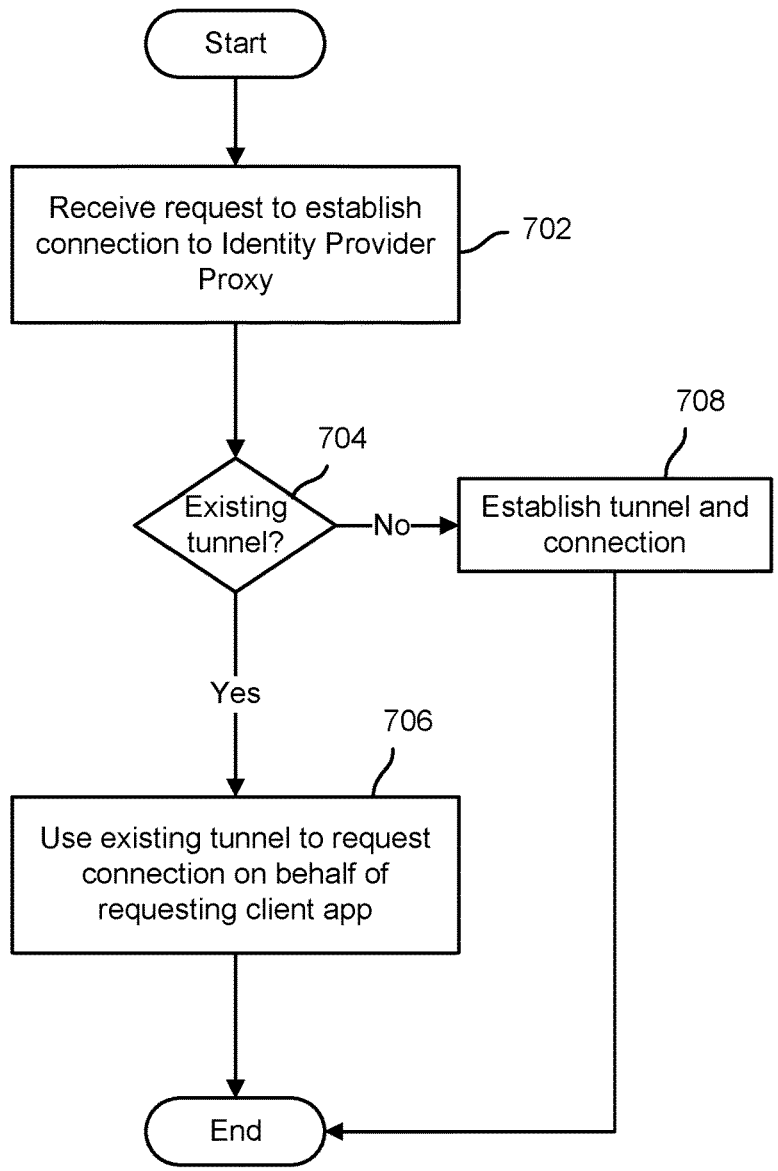
FIG. 7 is a flow chart illustrating an embodiment of a process to provide secure mobile Single Sign-on access to cloud-based services.

FIG. 7 is a flow chart illustrating an embodiment of a process to provide secure mobile Single Sign-on access to cloud-based services. In various embodiments, the process of FIG. 7 may be implemented by a tunnel plug-in or other tunnel client, such as tunnel plug-in 110 of FIGS. 1A and 1B and/or a tunnel server or other server side component, such as tunnel server 114 of FIGS. 1A and 1B. In the example shown, a request to establish a connection to an IdP Proxy is received (702), e.g., at a tunnel plug-in such as tunnel plug-in 110 of FIGS. 1A and 1B. It is determined whether a secure tunnel to a destination associated with the IdP has already been established (704). If so, the existing tunnel is used to establish a connection to the IdP on behalf of the requesting mobile client app (706). If not (704), then a tunnel is established, as described above, and used to establish the requested connection to the IdP proxy.

In various embodiments, if one mobile app has authenticated to its associated cloud-based service as described herein, subsequent apps may authenticate to their respective associated services using the same secure tunnel and associated trust established to service the connection request of the first mobile app to request a connection to the IdP Proxy. In various embodiments, a security token (e.g., cookie, SAML assertion) cached and/or regenerated at the security proxy server may be used to allow subsequent apps to authenticate to their respective cloud-based services. In various embodiments, one or more of user, mobile device, app, and certificate information may be cached at the security proxy server (e.g., at/by the tunnel server, the IdP Proxy, or another entity) and may be used to obtain a security token to be used by a second or other subsequently requesting mobile app on the same device to authenticate to its corresponding cloud-based service.

Figure 8:
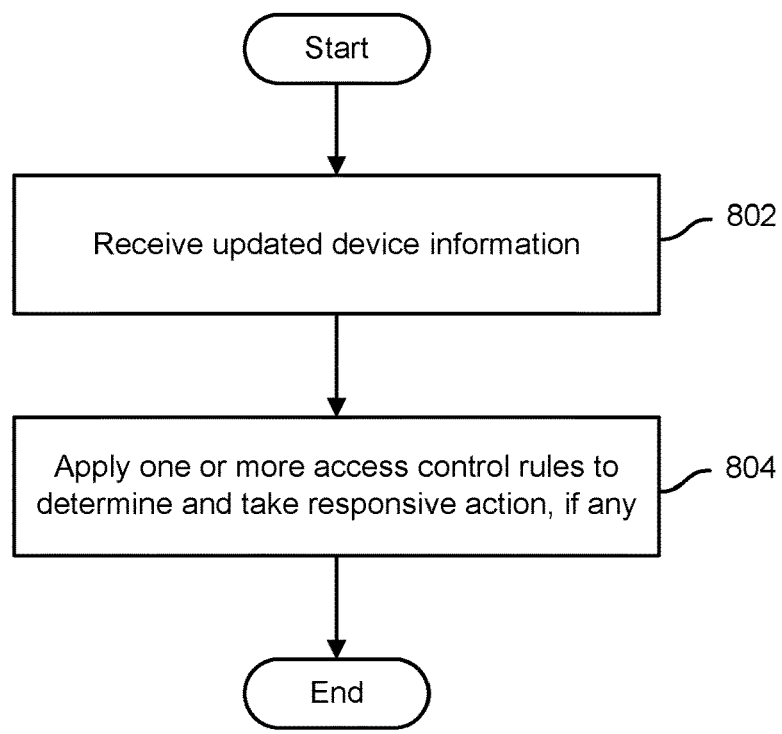
FIG. 8 is a flow chart illustrating an embodiment of a process to monitor and control access to a cloud-based service based on device security posture.

FIG. 8 is a flow chart illustrating an embodiment of a process to monitor and control access to a cloud-based service based on device security posture. In various embodiments, the process of FIG. 8 may be implemented by one or more of a mobile device management agent, a tunnel plug-in, a tunnel server, and an identity provider (IdP) proxy, such as MDM agent 104, tunnel plug-in 110, tunnel server 114, and/or IdP Proxy 120 of FIGS. 1A and 1B. In the example shown, updated mobile device security, policy, and/or other compliance information is received (802). For example, one or more of a tunnel plug-in, and MDM agent, and a security proxy server may receive updated information about a mobile device from an EMM server or other node monitoring the mobile device for compliance. One or more conditional access control rules may be applied, as applicable, to determine and take any responsive action that may be required. For example, one or more rules may be stored on a security proxy server such as server 116 of FIGS. 1A and 1B. Each rule may indicate one or more criteria that if satisfied require one or more responsive actions defined in the rule to be taken. For example, a rule may indicate that if a mobile device is determined to have been jailbroken and/or rooted, access to cloud-based and/or enterprises premises based services is to be cut off. Another rule may indicate that if a device is taken outside a certain geographical zone (e.g., geo-fence, home country, home region, enterprise campus or not, etc.) then access may be degraded or regulated in ways short of blocking access, such as by limiting access to certain on premises or cloud-based services and/or resources, limiting functionality such as downloading, forwarding, posting, etc.

In various embodiments, a rule based approach enables policies to be changed readily, by updating the rule set, and allows for finer control to be defined and exercised over mobile devices and apps installed thereon.

Figure 9:
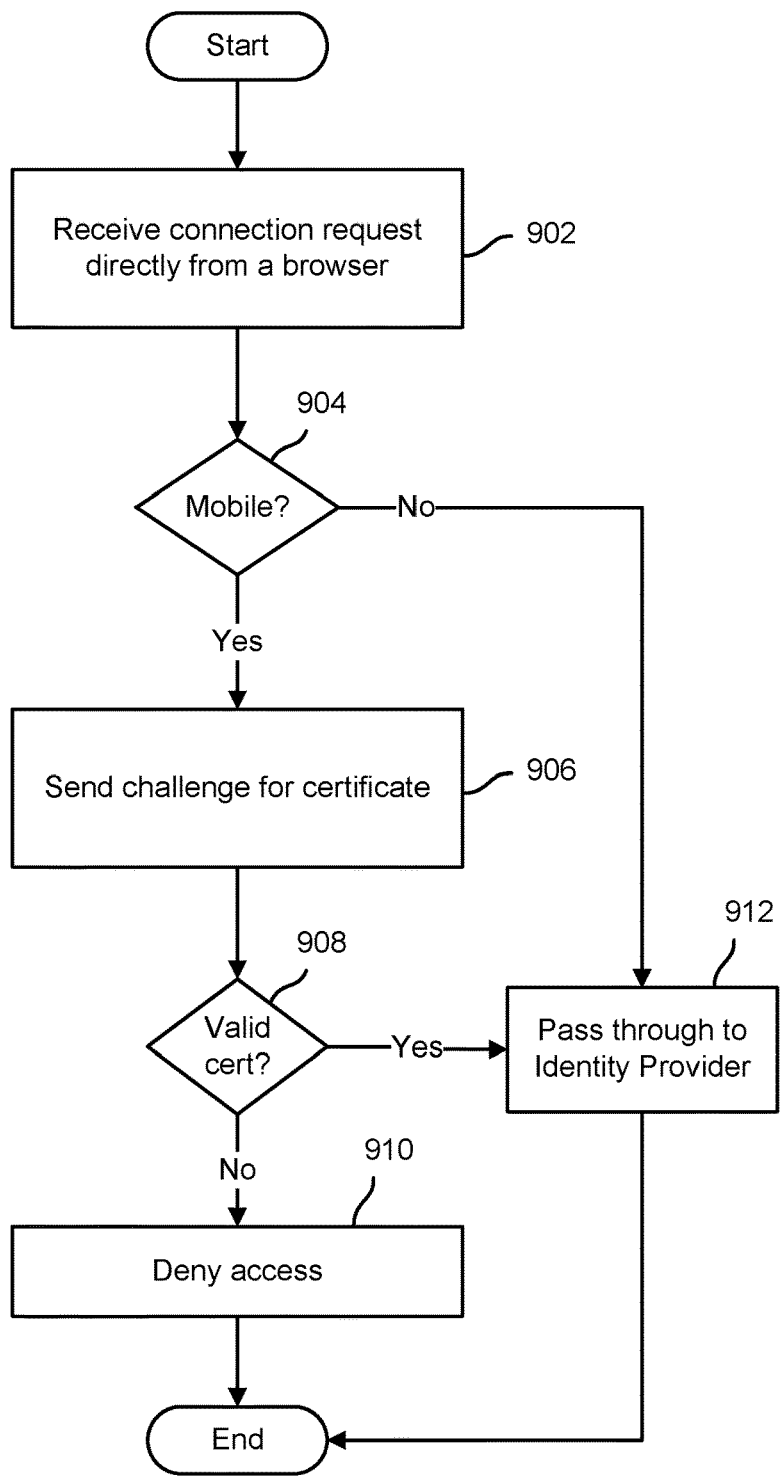
FIG. 9 is a flow chart illustrating an embodiment of a process to provide secure mobile access to a cloud-based service.

FIG. 9 is a flow chart illustrating an embodiment of a process to provide secure mobile access to a cloud-based service. In various embodiments, the process of FIG. 9 may be implemented by an identity provider (IdP) proxy, such as IdP Proxy 120 of FIGS. 1A and 1B. In various embodiments, the process of FIG. 9 may be used to manage access to cloud-based or other services differentially depending on the nature of the device and/or application being used to access the service. In the example shown, a connection request is received at an IdP Proxy directly from a browser or other application (902), i.e., not via a tunnel or tunnel server as in the example shown in FIG. 1B. In various embodiments, the connection request may be received from a browser, an unmanaged application, or a managed application communicating other than via a secure tunnel. If the browser or other requesting application is determined to be associated with a mobile device (904), as opposed to a desktop browser or other desktop software, then a challenge is sent to request that a certificate be provided to authenticate the user and/or device (906). In some embodiments, a response other than a challenge to present a certificate may be sent. For example, a determination may be made based on IP address (e.g., whitelisted IP address range, etc.) and/or other dynamically determined information as to whether the connection should be allowed. If a certificate is not provided and/or is determined to not be valid (or, in some embodiments, to be associated with a device not currently in a secure or otherwise compliant posture), or in some alternative embodiments if other criteria for acceptance of the connection (e.g., within whitelisted IP range and/or other configured and/or configurable acceptance criteria), then access is denied (910). If a valid certificate is present (908), or if the browser was determined to be a desktop (i.e., non-mobile) browser (and/or other acceptance criteria have been determined to have been satisfied) (904), then the request is processed normally (912), such as by passing the requests (e.g., proxying the connection) through to the "real" IdP associated with the service. In some embodiments, even if a valid certificate has been presented (908), conditional access rules may be applied to determine whether to allow or block the request, e.g., based on user agent (e.g., brand or version of browser or other software being used, source IP address, etc.).

Figure 10:
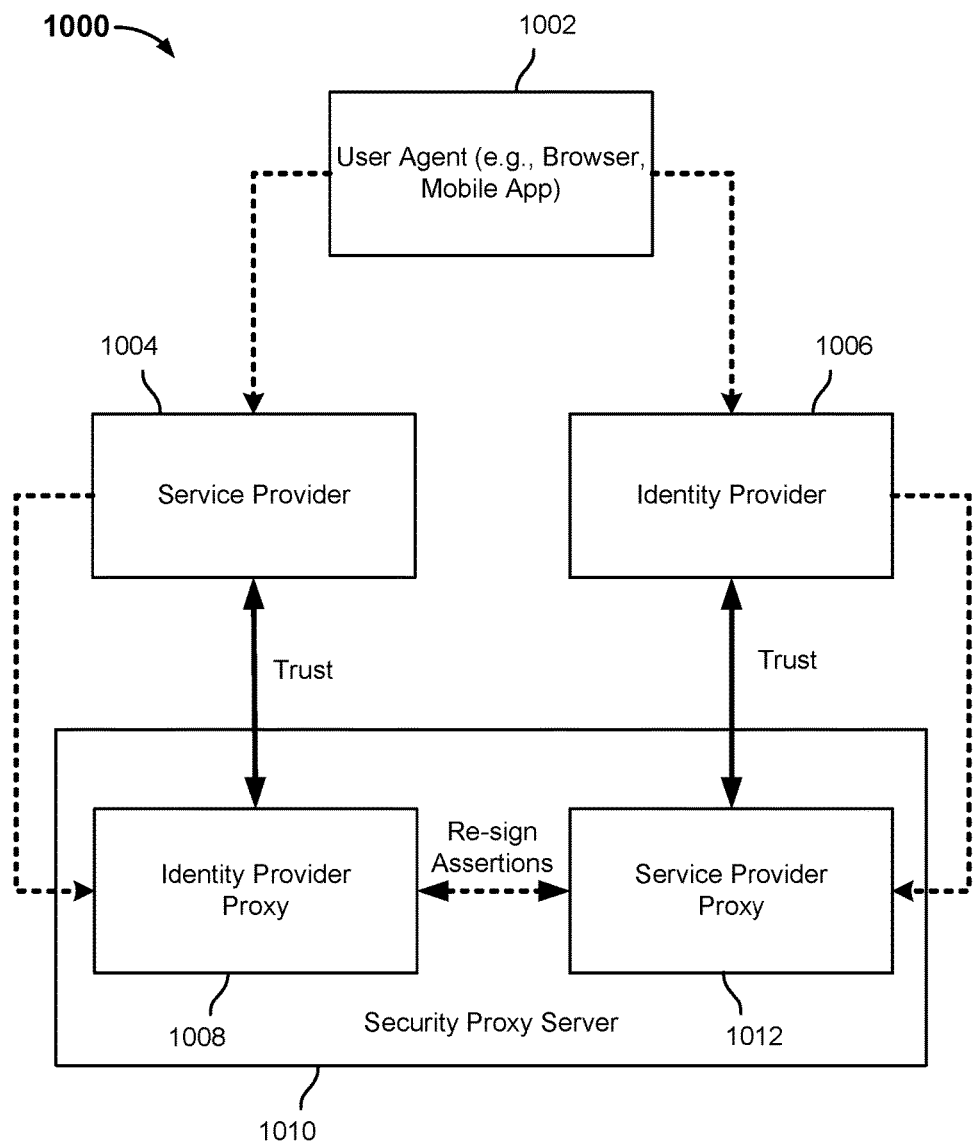
FIG. 10 is a block diagram illustrating an embodiment of a system to provide secure access to a cloud-based service via a delegated identity provider architecture and model.

In the example shown, the system and environment 1000 includes one or more user agents, represented in FIG. 10 by user agent 1002, e.g., without limitation, a browser, managed app, unmanaged app, or other software running on a mobile or other device, configured to be used to access a cloud-based service provided by a service provider 1004, e.g., Box.Com™ Dropbox™, or Salesforce.Com®. User agent 1002 is associated with an identity provider 1006, e.g., an on-premises, cloud-based, or other identity provider, such as the PingOne™ service offered by Ping Identity Corporation™. In the example shown, a trust relationship has been established between service provider 1004 and identity provider proxy 1008 running on security proxy server 1010. For example, service provider 1004 and identity provider proxy 1008 may have exchanged certificates. Similarly, a trust relationship has been established between identity provider 1006 and service provider proxy 1012, e.g., via exchange of certificates.

Identity provider proxy 1008 and service provider proxy 1012 have a trust relationship established between them and each has been configured to re-sign assertions on behalf of the other, in some embodiments as described more fully below in connection with FIGS. 11A and 11B. For example, in various embodiments, identity provider proxy 1008 is configured to provide to service provider 1004 and/or user agent 1002 (e.g., for further presentation to and consumption by identity provider 1006) assertions signed by identity provider proxy 1008 on behalf of (i.e., acting and appearing as) service provider proxy 1012. Similarly, in various embodiments, service provider proxy 1012 is configured to provide to identity provider 1006 and/or user agent 1002 (e.g., for further presentation to and consumption by service provider 1004) assertions signed by service provider proxy 1012 on behalf of (i.e., acting and appearing as) identity provider proxy 1008.

In various embodiments, user agent 1002 may initiate access to a service provided by service provider 1004 either by first contacting the service provider 1004 or by first authenticating with identity provider 1006 and then accessing the service provided by service provider 1004. For example, user agent 1002 may send to service provider 1004 a request to access the service. If service provider 1004 determines there is no existing (i.e., previously authenticated) session with user agent 1002, service provider 1004 may be configured to redirect the user agent 1002 to identity provider proxy 1008, which in turn may redirect the user agent 1002 to identity provider 1006 via a communication signed by identity provider proxy 1008 using a certificate associated with service provider proxy 1012. Identity provider 1006 may challenge the user agent 1002 for credentials, and upon successful login may provide to user agent 1002 for presentation to service provider proxy 1012 a first (SAML or other) assertion, which service provider proxy 1012 may be configured to use to provide to user agent 1002 a second (SAML or other) assertion, signed by service provider proxy 1012 using a certificate associated with identity provider proxy 1008, to be presented to service provider 1004 to gain access to the service (or other resource).

In various embodiments, identity provider-initiated authentication may be performed by user agent 1002 being used to access and log in via identity provider 1006, prior to attempting to access the service associated with service provider 1004. Upon successful login, identity provider 1006 may provide via a graphical or other user interface presented at user agent 1002, e.g., a webpage, a list or other representation of one or more services the authenticated user may access. Selection of a service associated with service provider 1004 may result in the identity provider 1006 providing to user agent 1002 for presentation to service provider proxy 1012 a first (SAML or other) assertion, which service provider proxy 1012 may be configured to use to provide to user agent 1002 a second (SAML or other) assertion, signed by service provider proxy 1012 using a certificate associated with identity provider proxy 1008, to be presented to service provider 1004 to gain access to the service (or other resource).

Figure 11A:
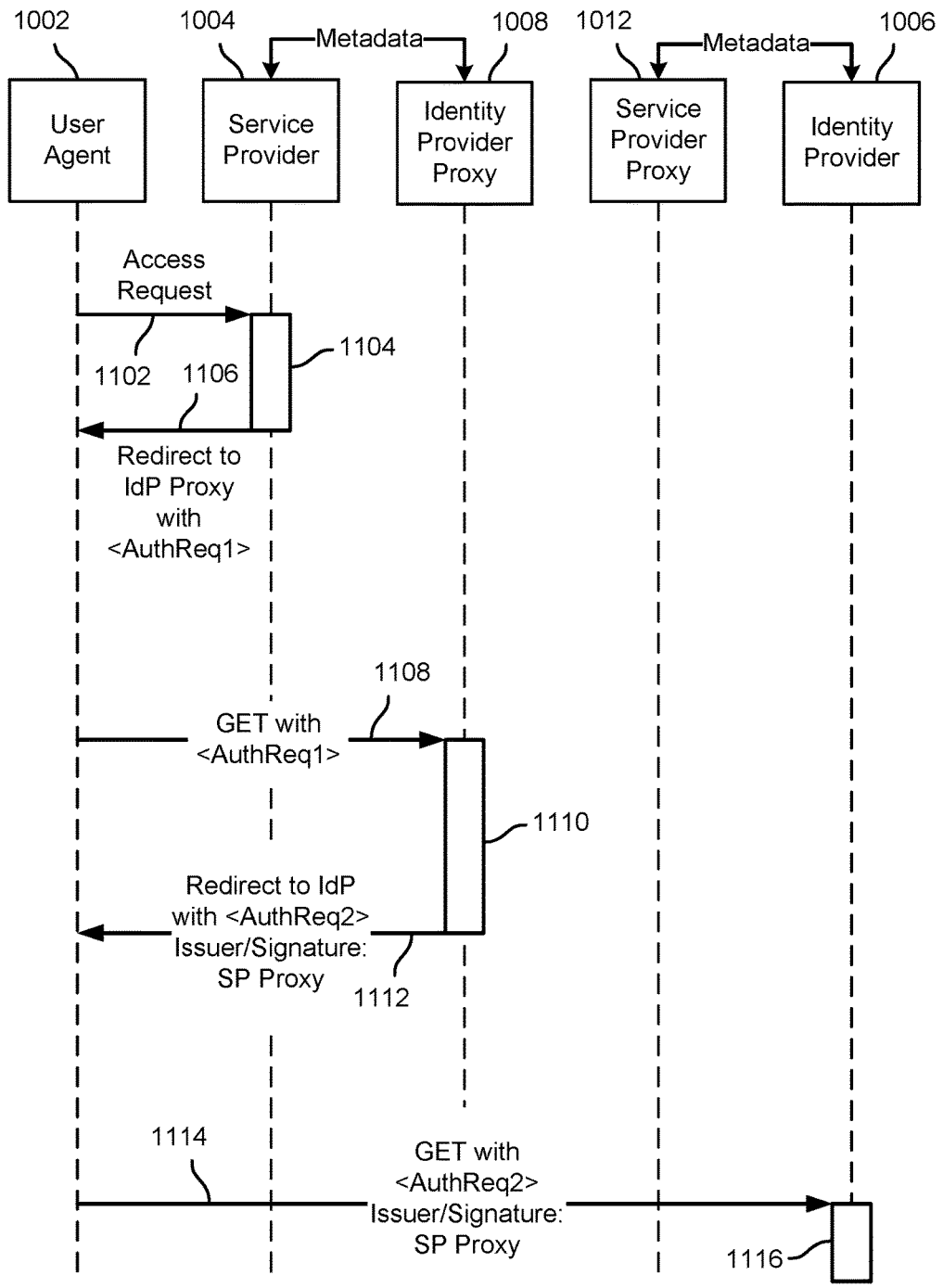
FIGS. 11A and 11B are sequence diagrams that illustrate an example of a sequence of calls among entities represented in FIG. 10, in various embodiments, to provide secure access to a service.
Figure 11B:
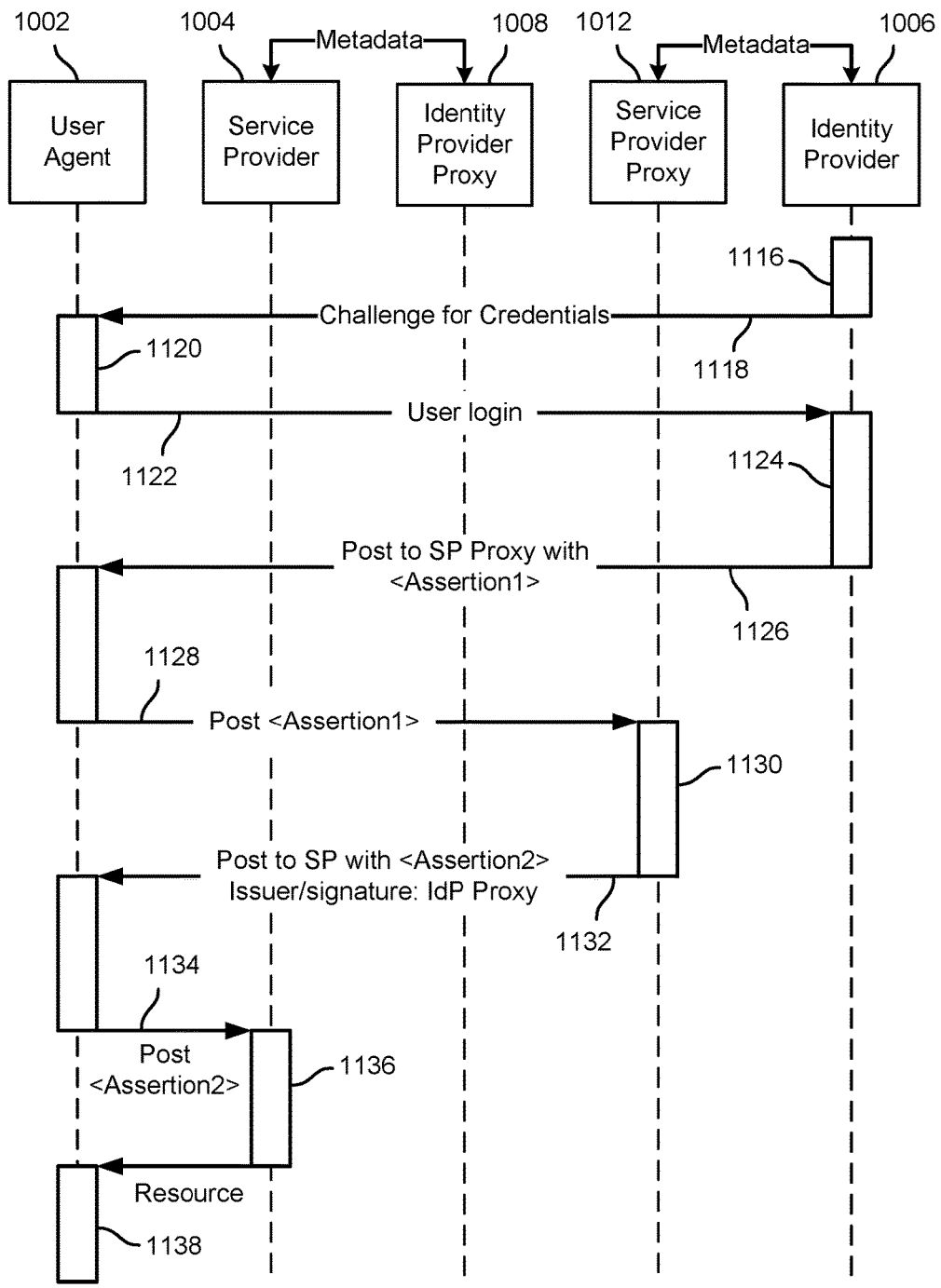

FIGS. 11A and 11B are sequence diagrams that illustrate an example of a sequence of calls among entities represented in FIG. 10, in various embodiments, to provide secure access to a service. Referring first to FIG. 11A, in the example shown, a request 1102 to access a service is sent from user agent 1002 to service provider 1004. Service provider 1004 processes the request (1104), and determines in this example that no previously-authenticated session exists. Service provider 1004 redirects user agent 1002 to identity provider proxy 1008, via a communication 1106 that includes an authentication request to be presented to identity provider proxy 1008. User agent 1002 provides the authentication request to identity provider proxy 1008 via an hypertext transfer protocol (HTTP) GET request 1108. In various embodiments, request 1108 may be gated by conditional access control rules enforced, for example, by a tunnel plugin or other entity on the mobile (or other) device. Identity provider proxy 1008 processes the request (1110), including by generating a second authentication request signed by identity provider proxy 1008 using a certificate (or other secret data) associated with service provider proxy 1012. The second authentication request is provided to user agent 1002 via a redirect communication 1112 redirecting the user agent to identity provider 1006. User agent 1002 in turn provides the second authentication request (signed by identity provider proxy 1008 using a certificate associated with service provider proxy 1004, so as to appear to have been signed by service provider proxy 1004) to identity provider 1006 via a GET request 1114. Identity provider 1006 receives and processes the GET request (1116).

Referring now to FIG. 11B, in a service provider-initiated authentication scenario, such as described above in connection with FIG. 11A, the processing performed by identity provider 1006 at 1116 may include verifying the second authentication request with the service provider proxy's signing certification and concluding that no existing authenticated identity provider session is found for the user agent 1002. In some embodiments, processing may be performed at 1116 by identity provider 1006 in response to an identity provider-initiated authentication request, e.g., from user agent 1002.

Referring further to FIG. 11B, in the case of either a service provider-initiated authentication (see FIG. 11A) or an identity provider-initiated authentication, the identity provider 1006 sends a challenge for credentials 1118. A user may enter credentials (e.g., username and password) at 1120 and submit them to identity provider 1006 via a user login response 1122. The identity provider validates the credentials at 1124 (e.g., using enterprise Active Directory® or other directory information), and generates a first SAML (or other) assertion ("Assertion1" as shown) and an associated identity provider session (e.g., sets cookie for identity provider domain). The first assertion is provided to service provider proxy 1012 via user agent 1002 via an HTTP POST communication (1126, 1128). In some embodiments, communication 1128 may be gated by conditional access rules, e.g., by a tunnel plugin. For example, communication 1128 may only be posted to the service provider proxy, in some embodiments, if the device is in a compliant posture/state. Service provider proxy 1012 processes the request (1130), e.g., by consuming the first assertion and generating a second assertion signed by service provider proxy 1012 on behalf of identity provider proxy 1008 (i.e., using a certificate of identity provider proxy 1008, so as to appear to have been issued and/or sent by identity provider proxy 1008). The second assertion is sent to user agent 1002 via a POST communication 1132, resulting in the second assertion being presented to service provider 1004 via POST communication 1134. Service provider 1004 consumes the second assertion (1136) and generates a service provider session for the user agent 1002 (e.g., sets cookie or other token, such as OAuth, for service provider domain), enabling the user agent 1002 to access the service or other resource during a service access session 1138.

In some embodiments, a delegated identity provider architecture and model, such as the one shown in FIG. 10, may be used in an environment in which mobile or other devices may be under management by an EMM server or other mobile device management (MDM) entity and/or in which all or a subset of apps on a managed device may be managed (or not managed). In some embodiments, MDM compliance or other device posture information may be used to block or limit access to a service provided by a service provider.

In some embodiments, a secure tunnel may be established between a managed mobile or other device and a security proxy server or other server on which one or both of an identity provider proxy (such as identity provider proxy 1008) and a service provider proxy (such as service provider proxy 1012), or a node associated with such a security proxy server. As described above, a certificate or other cryptographic data may be presented to establish the secure tunnel. The certificate may be mapped to a device, user, app, etc., and may be used to determine compliance/posture information. In various embodiments, the secure tunnel may be used to control access to a cloud-based service, e.g., by blocking a connection to an identity provider proxy and/or a service provider proxy.

In various embodiments, conditional access rules may be defined by a user and enforced by the security proxy server or a related node, including in systems in which a delegated identity provider proxy architecture is used. Conditional access rules may be applied based on contextual information, e.g., whether device and/or user agent (e.g., requesting mobile app) is under management; the type, provider, and version of the user agent software (e.g., browser, type of browser, etc.); IP address (e.g., whitelisted IP address range);

whether the connection is initiate via the identity provider or the service provider; the type of operating system and/or platform; etc.

In various embodiments, techniques disclosed herein may enable secure access to be provided to cloud-based services. Single sign-on and device security posture (and/or other information) may be used to provide, manage, and/or control access to cloud-based services by users of mobile devices, without exposing Enterprise user credentials, such as usernames and passwords, being stored or entered on mobile devices and/or at cloud-based services.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A system, comprising:
a processor configured to:
receive a request associated with a first client app on a device to connect to the system, wherein the first client app is associated with a first cloud-based service;
determine that a secure tunnel associated with the device and a second cloud-based service exists, wherein a second client app is associated with the second cloud-based service, wherein the secure tunnel was used to authenticate the second client app to the second cloud-based service;
determine that information associated with the device is cached at the system;
use the determined information to obtain a security token to be used by the first client app to authenticate to the first cloud-based service; and
provide the security token to the first client app, wherein the secure tunnel and the security token are to be used by the client app to access to the first cloud-based service;
monitor a compliance posture of the device; and
block access to the first cloud-based service based at least in part on an indication that the compliance posture of the device has changed; and
a memory coupled to the processor and configured to provide the processor with instructions.

2. The system of claim 1, wherein the request is sent by the first client app in response to a redirect message received from the first cloud-based service.

3. The system of claim 2, wherein the redirect message includes a URL or other locator associated with a security proxy.

4. The system of claim 1, wherein a security proxy is associated with the system and the secure tunnel is established between the device and a tunnel server running on the system.

5. The system of claim 1, wherein to establish the secure tunnel, the processor is configured to receive from the device a security certificate.

6. The system of claim 5, wherein the processor is further configured to use information comprising the security certificate to determine one or more of device, app, user, and certificate information.

7. The system of claim 5, wherein the processor is further configured to use information associated with the security certificate to determine that the first client app is authorized to access the first cloud-based service.

8. The system of claim 1, wherein a secure proxy of the system comprises an identity provider proxy configured to have a chained identity provider or other trust-based relationship to the identity provider associated with the second cloud-based service.

9. The system of claim 8, wherein the processor is further configured to determine that the secure tunnel has already been established and to establish the requested connection to the identity provider proxy on behalf of the first client app without requiring any further credential to be provided.

10. The system of claim 1, wherein the security token comprises a Security Assertion Markup Language (SAML) assertion.

11. The system of claim 8, wherein the security proxy comprises a delegated identity provider.

12. The system of claim 8, wherein the security proxy comprises a service provider proxy.

13. The system of claim 12, wherein the processor is configured to sign the security token as and on behalf of an identity provider proxy associated with the first cloud-based service.

14. A method, comprising:
receiving a request associated with a first client app on a device to connect to a security proxy server, wherein the first client app is associated with a first cloud-based service;
determining that a secure tunnel associated with the device and a second cloud-based service exists, wherein a second client app is associated with the second cloud-based service, wherein the secure tunnel was used to authenticate the second client app to the second cloud-based service;
determining that information associated with the device is cached at the security proxy server;
using the determined information to obtain a security token to be used by the first client app to authenticate to the first cloud-based service;
providing the security token to the first client app, wherein the secure tunnel and the security token are to be used by the client app to access to the first cloud-based service;
monitoring a compliance posture of the device; and
blocking access to the first cloud-based service based at least in part on an indication that the compliance posture of the device has changed.

15. The method of claim 14, wherein the request is sent by the first client app in response to a redirect message received from the first cloud-based service.

16. The method of claim 15, wherein the redirect message includes a URL or other locator associated with a security proxy.

17. The method of claim 14, wherein a security proxy is associated with the system and the secure tunnel is established between the device and a tunnel server running on the system.

18. The method of claim 13, wherein establishing the secure tunnel includes receiving from the device a security certificate.

19. A computer program product to provide secure access to a cloud-based service, the computer program product being embodied in a non-transitory computer readable storage device and comprising computer instructions for:
receiving a request associated with a first client app on a device to connect to a security proxy server, wherein the first client app is associated with a first cloud-based service;

determining that a secure tunnel associated with the device and a second cloud-based service exists, wherein a second client app is associated with the second cloud-based service, wherein the secure tunnel was used to authenticate the second client app to the second cloud-based service;

determining that information associated with the device is cached at the security proxy server;

using the determined information to obtain a security token to be used by the first client app to authenticate to the first cloud-based service;

providing the security token to the first client app, wherein the secure tunnel and the security token are to be used by the client app to access to the first cloud-based service;

monitoring a compliance posture of the device; and blocking access to the cloud-based service based at least in part on an indication that the compliance posture of the device has changed.

* * * * *

UNITED STATES PATENT AND TRADEMARK OFFICE
CERTIFICATE OF CORRECTION

PATENT NO. : 10,320,801 B2
APPLICATION NO. : 16/141716
DATED : June 11, 2019
INVENTOR(S) : Kumara Das Karunakaran, Vijay Pawar and Jian Liu It is certified that error appears in the above-identified patent and that said Letters Patent is hereby corrected as shown below:

In the Specification

In Column 10, Line 23, after "Box.Com™", insert --,--.

In the Claims

In Column 14, Claim 18, Line 57, delete "13" and insert --14--, therefor.

Signed and Sealed this
Seventeenth Day of December, 2019

Andrei Iancu
*Director of the United States Patent and Trademark Office*